April 4, 1967  MASARU KOBAYASHI  3,312,091
CONTROL SYSTEM FOR MATERIAL REDUCING APPARATUS
Filed May 19, 1964  3 Sheets-Sheet 1

| ROLLING SPEED, m/min | 20.0 | 20.0 | 20.0 |
| ROLLING PROCESS, min. | 0.075—0.065 | 0.043—0.035 | 0.075—0.070 |
| ROLLING PRESSURE, Kg | 1980 | 1830 | 1950 |
| TENSION LIMIT | LIMIT | LIMIT | NO LIMIT |

INVENTOR.
Masaru Kobayashi
BY
Western & Western

April 4, 1967  MASARU KOBAYASHI  3,312,091
CONTROL SYSTEM FOR MATERIAL REDUCING APPARATUS
Filed May 19, 1964  3 Sheets-Sheet 3

FIG. 3

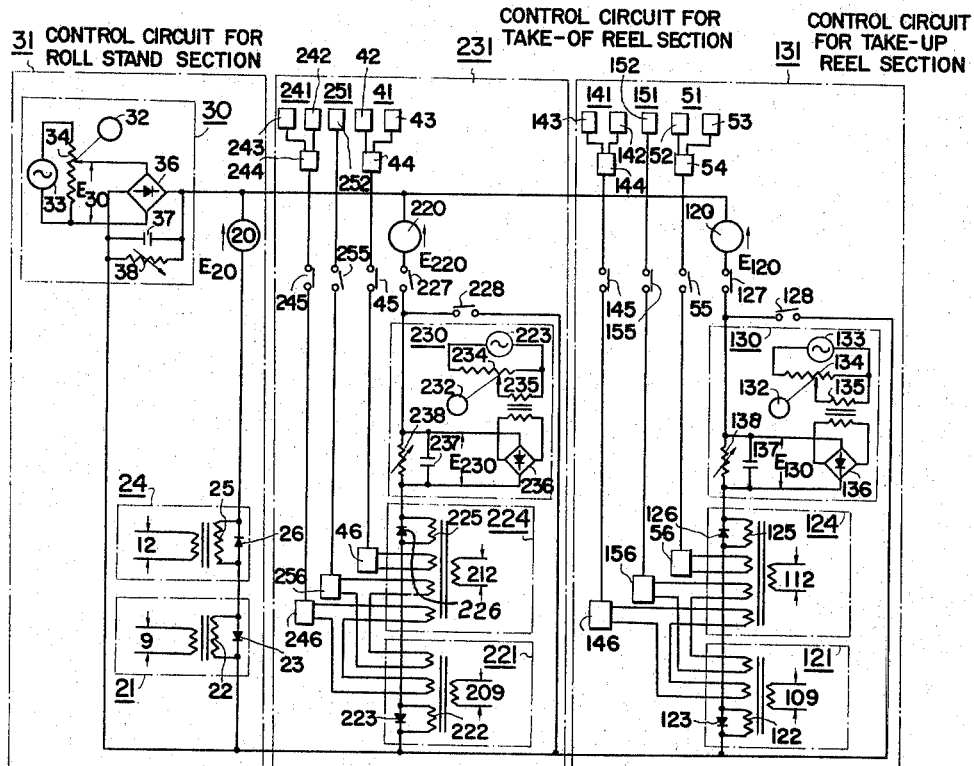

- 143, 243 : TENSION STANDARD SETTING CIRCUIT
- 142, 242 : TENSION DETECTOR
- 152, 252 : DEFLECTION DETECTOR
- 42, 52 : THICKNESS GAUGE
- 43, 53 : THICKNESS STANDARD SETTING DEVICE
- 144, 244, 54, 44 : COMPARATOR
- 46, 56, 156, 256, 146, 246 : AMPLIFIER
- 120, 220 : GENERATOR FOR REEL SPEED DETECTION
- 132, 232 : VARIABLE SPEED MOTOR
- 20 : GENERATOR FOR ROLLING SPEED DETECTION
- 32 : VARIABLE SPEED MOTOR

INVENTOR.
Masaru Kobayashi
BY
Western & Western

United States Patent Office 3,312,091
Patented Apr. 4, 1967

3,312,091
CONTROL SYSTEM FOR MATERIAL
REDUCING APPARATUS
Masaru Kobayashi, Toshima-ku, Tokyo-to, Japan, assignor to Kabushiki Kaisha Hitachi Seisakusho, Tokyo-to, Japan, a joint-stock company of Japan
Filed May 19, 1964, Ser. No. 368,676
Claims priority, application Japan, May 20, 1963,
38/25,322
15 Claims. (Cl. 72—11)

This invention relates to techniques and means for working and reducing the cross sectional dimensions of materials. More particularly, the invention relates to new methods and apparatuses for driving and automatically controlling the speed of work rolls and driving and automatically controlling the tension of take-up reels and take-off reels in material dimension reducing means, particularly in apparatuses such as strip mills and rod mills.

In order to produce a product of uniform thickness in a metal strip mill, it is necessary to regulate the working speed of the work rolls participating directly in the working process and, simultaneously, to accomplish take-up and take-off of the product as the front and back tensions thereon are maintained constant irrespectively of the progressive variations in the take-up and take-off diameters of the take-up and take-off reels. At the same time, it is necessary to carry out adjustments such as adjustment of the gap between the work rolls in accordance with measurements of the product thickness and adjustments of the front and back tensions in response to small variations in the product thickness.

To attain the above described operation, the conventional practice has been to use a direct-current motor to drive and control the speed of the work rolls either directly or indirectly and to drive and control the tensions on the take-up and take-off reels. Recently, there have been proposed drive and control means of the type consisting of a combination of a hydraulic torque converter and a stepless variable-speed mechanism.

However, a drive and control system depending on direct-current motors not only requires a tremendous expenditure for equipment but also requires an extremely complicated operation. Furthermore, control by means of a combination of a hydraulic torque converter and a stepless variable-speed mechanism over a wide range of speed and tension is difficult and, moreover, requires high-price equipment.

It is an object of the present invention, in its broader aspects, to overcome the above described difficulties by replacing the conventional direct-current system of high cost and complicated operation and the control system consisting of a combination of a hydraulic torque converter and a stepless variable speed mechanism, of narrow control range, by a low-cost, alternating-current system of wide control range.

Briefly described, the present invention contemplates the use of a combination of an induction motor, an electromagnetic coupling, and (or) an electromagnetic brake as a drive motor unit to drive and speed control the work rolls either directly or indirectly and, at the same time, the use of combinations, each of an induction motor, an electromagnetic coupling, and an electromagnetic brake, as reel motor units to drive the take-up and take-off reels and control their respective tensions in accordance with the rolling speed.

The specific nature, principle, and details of the invention, as well as other objects and advantages thereof, will be more clearly apparent by reference to the following detailed description of a preferred embodiment of the invention as applied to the rolling of metal strip material, when taken in conjunction with the accompanying drawings in which like parts are designated by like reference characters, and in which:

FIG. 3 is a schematic diagram indicating a circuit composition and arrangement suitable for the practice of the method of the invention for driving and controlling the three principal sections of the arrangement shown in FIGS. 1 and 2.

FIGS. 1 and 2 show an application of the invention to a reversing four-high mill. The case when the rolling of strip is being carried out from left to right is shown in FIG. 1, and this direction is correspondingly from top to bottom in FIG. 2.

Figure 1:
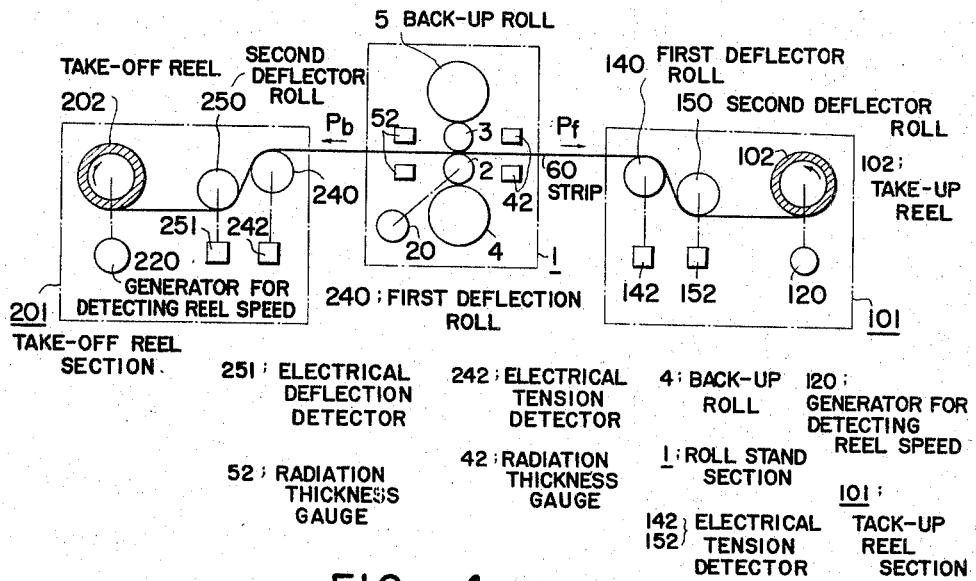
FIG. 1 is a schematic layout diagram, in side elevation, showing the general arrangement of the essential equipment for driving and controlling the roll stand section, take-up reel section, and the take-off reel section according to the invention.

The roll stand section 1 has a roll stand (not shown) provided with a pair of work rolls 2 and 3 and a pair of back-up rolls 4 and 5. The work rolls 2 and 3 are driven by an induction motor 15, the power therefrom being transmitted to the work rolls through an electromagnetic coupling 14 having a rotating magnetic pole 12 and a rotating eddy current drum 13, an electromagnetic brake 11 having stationary magnet poles 9 and a rotating eddy current drum 10, a speed reducing mechanism 8, a pinion 7 having a reversing mechanism, and shafts 6 and 6a (6a not shown).

Depending on the circumstances, the work rolls, instead of being driven directly, may be driven indirectly by friction between the work rolls and back-up rolls or some other suitable rolls which are adapted to be driven.

The rotational speed of the work rolls 2 and 3, that is, the rolling speed of the strip 60 being rolled, is detected from the output voltage $E_{20}$ of a generator 20 for rolling speed detection which is coupled to and driven by the shaft of a pulley 17 driven in turn by the shaft of the electromagnetic coupling 14 through a pulley 16 fixed to said shaft and a belt stretched over the pulleys 16 and 17.

The transmission and control of the mechanical power from the induction motor 15 to the work rolls 2 and 3 is accomplished by controlling, by a method to be described hereinafter, the exciting current supplied to the electromagnetic brake 11 and the electromagnetic coupling 14. By this method it is possible to control the rotating speed and rotating torque of the work rolls in a stepless manner over a substantially wide range of respective values.

For correcting fluctuations in the thickness of rolled strip, electrical thickness gauges such as, for example, radiation thickness gauges 52 and 42, are provided in the vicinity of the entrance and exit, respectively, of the strip 60 with respect to the work rolls 2 and 3.

The take-up reel section 101 and the take-off reel section 201 are adapted to make possible forward and reverse rolling by alternately taking up and taking off the strip 60. For this purpose, these sections 101 and 201 are constructed and arranged in an exactly symmetrical manner on the two sides of the roll stand section 1 as the center. For this reason, the following description of these two sections 101 and 201 is set forth in a parallel manner, designation pertaining to the section 201 being presented in parentheses.

In the take-up section 101 (or take-off section 201), the take-up reel 102 (take-off reel 202) is driven by an induction motor 115 (215), the power therefrom being transmitted to the take-up reel 102 (take-off reel 202) through an electromagnetic coupling 114 (214) having rotating magnet poles 112 (212) and a rotating eddy current drum 113 (213), an electromagnetic brake 111 (211) having stationary magnet poles 109 (209) and a rotating eddy current drum 110 (210), and a speed reducing mechanism 108 (208).

The transmission and control of the mechanical power from the motor 115 (215) to the take-up reel 102 (take-off reel 202) is accomplished by controlling, by a method to be described hereinafter, the exciting current supplied to the electromagnetic brake 111 (211) and the electromagnetic coupling 114 (214). By this method it is possible to control the rotating speed and rotating torque of the take-up reel 102 (take-off reel 202) in a stepless manner over a wide range of respective values.

The rotational speed of the take-up reel 102 (take-off reel 202) is detected from the output voltage $E_{120}$ ($E_{220}$) of a generator 120 (220) for reel speed detection which is coupled to and driven by the shaft of a pulley 117 (217) driven in turn by the shaft of the electromagnetic coupling 114 (214) through a pulley 116 (216) fixed to said shaft and a belt stretched over the pulleys 116 (216) and 117 (217).

At the end of the section 101 (201) nearest the roll stand section 1, there is provided a first deflector roll 140 (240) having the additional function of detecting the front tension $P_f$ (back tension $P_b$) of the strip 60, being coupled by suitable means to an electrical tension detector 142 (242) such as a strain gauge. Thus, the first deflector roll 140 (240) deflects and guides the strip 60 through a second deflector roll 150 (250) to the take-up reel 102 (from the take-off reel 202) and, simultaneously, detects by means of the detector 142 (242) the front tension $P_f$ (back tension $P_b$) on the strip 60.

The second deflector roll 150 (250) has the additional function of detecting slack or excessive tension in the strip 60, said roll being coupled by suitable means to an electrical deflection detector 152 (252) such as a slider type variable resistor. Thus the second deflector roll 150 (250) deflects and guides the strip 60 to the take-up reel 102 (from the take-off 202) and, simultaneously, detects by means of the detector 152 (252) the displacement of the second deflector roll from its normal position due to slack or excessive tension in the strip 60.

In the mill according to the present invention, the induction motors 115 and 215 are caused to rotate in such a manner that mutually opposite forces, that is, front tension $P_f$ and back tension $P_b$ act on the strip 60 by way of the above described deflector rolls when the take-up reel 102 and the take-off reel 202 operate, irrespective of the rolling direction of the strip 60. For example, in the case illustrated in FIG. 1, the motors 115 and 215 are caused to rotate so that torques are applied respectively counterclockwise on the side of the take-up reel 102 and clockwise on the side of the take-off reel 202 as indicated by the arrow marks on the reels. In some cases, the take-up reel 102 or the take-off reel 202 carries out take-up or take-off of the strip 60 in a slipping state.

During the rolling of a strip by means of a four-high mill of the above described construction and arrangement according to the invention, it is necessary, after the induction motors have been started, to raise the speed of the work rolls in a smooth manner up to the selected rolling speed and to control the speed constantly at this rolling speed. When the mill is to be stopped, it is further necessary to reduce the speed smoothly to zero.

On the one hand, it is also necessary to maintain the front and back tensions at respectively selected values and, moreover, to prevent breakage of the strip, by smoothly controlling the take-up and take-off reels not only during rolling at the constant selected speed, but also when the work rolls are being started, when they are being slowly stopped, and when they are being rapidly stopped.

Therefore, it is a specific object of the invention to provide a control system capable of accomplishing automatic control to produce the above described operation.

An embodiment of such a control system according to the invention is shown in FIG. 3, which shows only the essential components of the control circuit and is to be referred to in conjunction with the following description of the principle of the control system.

The entire control system shown in FIG. 3 consists of three sections, namely, a control circuit 31 for the roll stand section, a control circuit 231 for the take-off reel section, and a control circuit 131 for the take-up reel section.

The control circuit 31 for the roll stand section comprises, in series connection as shown: a standard setting circuit 30 for the rolling speed made up essentially of a variable-speed motor 32, an alternating-current source 33, a voltage regulator 34, a rectifier 36, a smoothing capacitor 37, and a variable resistance 38 (the output voltage of the circuit 30 being designated as the standard setting voltage $E_{30}$ for rolling speed); the aforementioned generator 20 for rolling speed detection (its output voltage being designated as the rolling speed detection voltage $E_{20}$, and its connection being so made that the directions of the voltages $E_{20}$ and $E_{30}$ are mutually opposite as shown by the arrows in FIG. 3); a parallelly connected combination of the control winding 25 of a magnetic amplifier 24 for the rotating magnetic poles 12 of the electromagnetic coupling 14 and a rectifier 26 connected in parallel with and in reverse direction to the operational direction of said winding 25; and a parallelly connected combination of the control winding 22 of a magnetic amplifier 21 for the stationary magnetic poles 9 of the electromagnetic brake 11 and a rectifier 23 connected in parallel with and in reverse direction to the operational direction of said winding 22.

When the difference voltage ($E_{30}-E_{20}$) between the voltages $E_{30}$ and $E_{20}$ is positive, a control current corresponding to this difference voltage flows through only the control winding 25 for the electromagnetic coupling 14, and, accordingly, only this coupling 14 operates. When said difference voltage is negative, a control current corresponding to said difference voltage flows through only the control winding 22 for the electromagnetic brake 11, and, accordingly, only this brake 11 operates.

In starting the work rolls 2 and 3, the induction motor 15 is first started, and then, by means of the variable speed motor 32, the voltage regulator 34 is gradually operated to cause the standard setting voltage $E_{30}$ for rolling speed to increase gradually from zero to the selected operational value. Then, until the rolling speed detection voltage $E_{20}$ reaches the aforesaid voltage, only the electromagnetic coupling 14 operates to raise the rotational speed of the work rolls 2 and 3, that is, the rolling speed of the strip 60, to the selected value. Thereafter, the electromagnetic coupling 14 or the electromagnetic brake 11, depending on the sign of the aforesaid difference voltage ($E_{30}-E_{20}$), operates to maintain the rolling speed at a constant value.

For smoothly stopping the work rolls 2 and 3, the standard setting voltage $E_{30}$ for rolling speed is gradually reduced, or it is cut off, whereupon the difference voltage ($E_{30}-E_{20}$) becomes negative, and the electromagnetic brake 11 operates, whereby it is made possible to stop the work rolls 2 and 3 in a gradual or relatively abrupt manner. It is to be noted that abrupt stopping of the work rolls 2 and 3 can be accomplished by cutting off the electric power supply other than that for the electromagnetic brake 11 and, simultaneously, passing an exciting current through the stationary magnetic poles 9 of the brake 11 up to saturation. Instead of an electromagnetic brake for the brake for stopping purpose, other means such as an electromagnetic clutch or a mechanical brake may be alternatively used, the control of the work rolls being accomplished by only the electromagnetic coupling.

In correspondence with symmetrical relationship of the take-up reel section 101 and the take-off reel section 201 as described hereinbefore, their respective control circuits 131 and 231 are symmetrically identical. Accordingly, the following description of these two control circuits 131 and 231 is set forth in a parallel manner, designation pertaining to the circuit 231 being presented in parentheses.

The main circuit of the control circuit 131 (231) for the take-up reel section 101 (for the take-off reel section 201) comprises, in series connection as shown: a tension standard setting circuit 130 (230) for setting the tension in the strip 60 made up essentially of a variable-speed motor 132 (232); an alternating-current source 133 (233); a voltage regulator 134 (234), a transformer 135 (235); a rectifier 136 (236); a capacitor 137 (237); a variable resistance 138 (238) being connected in parallel across the output terminals of said circuit 130 (230); a parallelly connected combination of the main control winding 125 (225) of a magnetic amplifier 124 (224) for the rotating magnetic poles 112 (212) of the electromagnetic coupling 114 (214) and a rectifier 126 (226) connected in parallel with and in reverse direction to the operational direction of said winding 125 (225); a parallelly connected combination of the main control winding 122 (222) of a magnetic amplifier 121 (221) for the stationary magnetic poles 109 (209) of the electromagnetic brake 111 (211) and a rectifier 123 (223) connected in parallel with and in reverse direction to the operational direction of said winding 122 (222); a switch 127 (227); the generator 120 (220) for reel speed detection; and the rolling speed standard setting circuit 30. Furthermore, a switch 128 (228) is connected in parallel across the two terminals of the circuit part made up of the tension standard setting circuit 130 (230), the control winding 125 (225) for the electromagnetic coupling 114 (214), and the control winding 122 (222) for the electromagnetic brake 111 (211) of this circuit 131 (231).

When this circuit 131 (231) is ued for take-up of the strip 60, the switch 127 (227) is closed, the switch 128 (228) is opened, and, with the work rolls 2 and 3 at rest and, moreover, in the state of compressing the strip 60, that is, with the rolling speed standard setting voltage $E_{30}$ and the reel speed detection voltage $E_{120}$ ($E_{220}$) at zero value, the variable-speed motor 132 (232) is gradually started up ot increase gradualy the tension standard setting voltage $E_{130}$ ($E_{230}$). Then, by maintaining the thickness and rolling rate of the strip 60 in accordance with predetermined values while detecting the front tension $P_f$ of the strip 60 by means of the tension detector 142 (242), a control current corresponding to the said voltage $E_{130}$ ($E_{230}$) is caused to flow through only the control winding 125 (225) of the magnetic amplifier 124 (224) for the electromagnetic coupling 114 (214), whereby only this coupling 114 (214) operates to maintain the tension on the strip at the predetermined value.

Then, when the rolling speed of the work rolls is raised from zero to the selected value, the rolling speed standard setting voltage $E_{30}$ is applied to this circuit in the same direction as the tension standard setting voltage $E_{130}$ ($E_{230}$), and the reel speed detection voltage $E_{120}$ ($E_{220}$) is applied in the opposite direction. As a result, when the resultant voltage $E_{30}+E_{130}-E_{120}$ ($E_{30}+E_{230}-E_{220}$) is positive, a control current corresponding thereto flows through only the main control winding 125 (225) of the magnetic amplifier for the electromagnetic coupling 114 (214), and, accordingly, only this coupling 114 (214) operates. When said resultant voltage becomes negative, a control current corresponding thereto flows through only the main control winding 122 (222) of the magnetic amplifier for the electromagnetic brake 111 (211), and, accordingly, only this brake 111 (211) operates to control the rotational speed and torque of the take-up reel 102 (take-off reel 202). Thus, it is possible to accomplish take-up of the strip 60 at a speed matching the rolling speed while the front tension $P_f$ on the strip is maintained constant.

When the above described control circuit 131 (231) is used for take-off of the strip 60, the switch 128 (228) is closed, the switch 127 (227) is opened, and, with the work rolls 2 and 3 at rest and, moreover, in the state of compressing the strip 60, the variable-speed motor 132 (232) is gradually started up to bring the tension standard setting voltage $E_{130}$ ($E_{230}$) up to the required value as the back tension $P_b$ of the strip 60 is detected by means of the tension detector 142 (242). Then, the take-up reel 102 (202), in a slipping state without rotating, applies the required back tension $P_b$ to the strip 60. When, with strip 60 under this tension state, the work rolls are operated, the torque, that is, the tension, does not vary greatly because of the characteristic of the electromagnetic coupling, and the reel rotates in the reverse direction in a slipping state and at a speed corresponding to the rolling speed, whereby the strip 60 is unreeled.

The control circuit 131 (231) for the take-up reel section 101 (take-off reel section 201) is further provided with three kinds of adjusting circuits.

The first of these circuits is a tension adjusting circuit 141 (241) for adjusting the front tension (back tension) of the strip 60. This circuit 141 (241) comprises the aforementoned tension detector 142 (242) coupled to the first deflector roll 140 (240) for the purpose of detecting the front tension $P_f$ (back tension $P_b$) on the strip 60, a tension standard setting device 143 (243), a comparator 144 (244) to obtain the difference between an output voltage proportional to the tension detected by the tension detector 142 (242) and the standard setting voltage of the tension standard setting device 143 (243), a switch 145 (245), and an amplifier 146 (246) to amplify said difference sent through the switch 145 (245), the resulting output of the amplifier 146 (246) being introduced as a control signal into the magnetic amplifier 124 (224) for the electromagnetic coupling 114 (214) and into the magnetic amplifier 121 (221) for the electromagnetic brake 111 (211) to effect the front tension adjustment.

The second of the aforesaid three adjusting circuits is an abnormal tension correcting circuit 151 (251) for correcting slack or excessive tension in the strip 60. This circuit 151 (251) comprises the aforementioned deflection detector 152 (252) coupled to the second deflector roll 150 (250) and producing an output voltage proportional to the deflection of said roll from its normal position, a switch 155 (255), and an amplifier 156 (256), said output voltage being sent by way of the switch 155 (255) and amplified by the amplifier 156 (256), and the resulting amplified output being introduced as a control signal into the magnetic amplifier 124 (224) for the electromagnetic coupling 114 (214) and into the magnetic amplifier 121 (221) for the electromagnetic brake 111 (211) to effect the correction of slack and excessive tension in the strip 60.

The third of the aforesaid adjusting circuits is a thickness regulating circuit 41 (51) for regulating the thickness of the rolled strip by effecting corrective action in response to fluctuations in said thickness, said circuit operating only when the control circuit 131 (231) of the take-up reel section 101 (take-off reel section 201) operates as the take-off side of the strip. This thickness regulating circuit 41 (51) comprises the aforementioned thickness gauge 42 for the take-up side (thickness gauge 52 for the take-off side) installed in the vicinity of the strip entrance-exit parts of the working rolls 2 and 3 and producing an output voltage proportional to the strip thickness, a thickness standard setting device 43 (53) producing a standard setting voltage, a comparator 44 (54) for obtaining the difference between said output voltage and said standard setting voltage and producing a corresponding output, a switch 45 (55), and an amplifier 46 (56) to amplifier said output sent from the comparator 44 (54) by way of the switch 45 (55) and to produce an amplified output which is introduced into the magnetic amplifier 224 (124) operating as the take-off side, fluctuations of the strip thickness on the take-up side thus being fed back to the take-off side to cause responsive increase or decrease of the back tension on the strip, whereby the rolled strip thickness is regulated.

While the arrangement and construction of the various equipment parts for drive and control and the composition and arrangement of the corresponding control circuits according to the invention have been described above, the nature of the invention will be indicated still more fully by the following description with respect to the application of the invention to actual rolling of strips.

Figure 2:
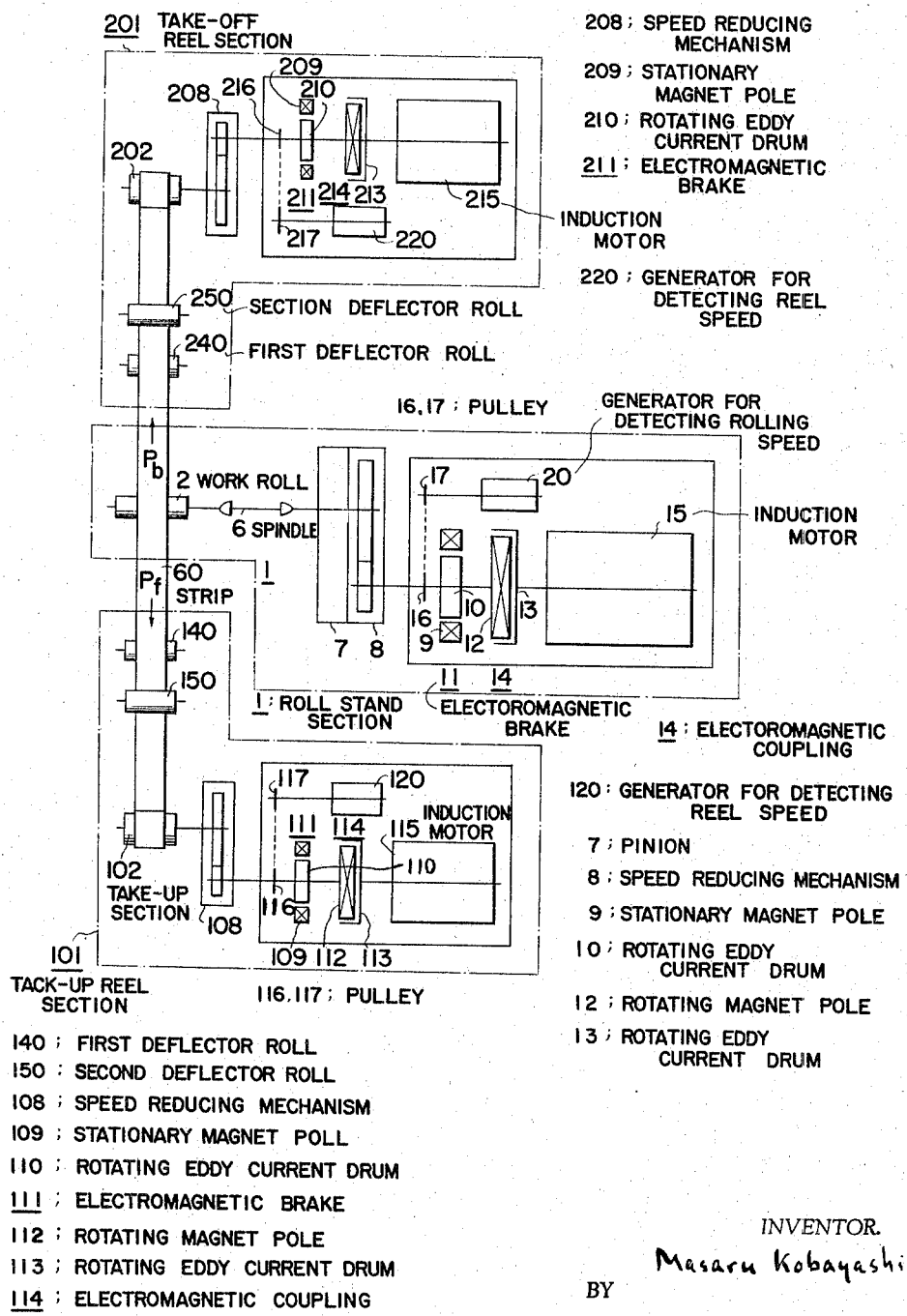
FIG. 2 is a plan view of the arrangement shown in FIG. 1.

The following description applies to the case when the rolling of the strip 60 is being carried out from left to right as viewed in FIG. 1 and top to bottom as viewed in FIG. 2, that is, the case when the aforementioned take-up reel section 101 and its control circuit 131 are on the take-up side of the strip 60, and the take-off reel section 201 and its control circuit 231 are on the take-off side of the strip 60.

First, after the strip 60 to be rolled has been placed in working position in the mill as shown in FIGS. 1 and 2, being passed through the gap between the work rolls 2 and 3 and attached to the take-up reel 102 and the take-off reel 202, the said roll gap is suitably set in accordance with the selected rolling rate to place the strip under compression. Then switches 55 and 128 of the control circuit 131 for the take-up reel section 101 and switches 227 and 255 of the control circuit 231 for the take-off reel section 201 are opened, and switches 127, 145, and 155 of the control circuit 131 and switches 45, 228, and 245 of the control circuit 231 are closed. The tension standard setting device of the side of the control circuit 131 and the thickness standard setting device 43 are set to the required strip thickness on the take-up side, and the tension standard setting device 242 of the side of the control circuit 231 is set to the required setting in accordance with the strip thickness on the take-off side.

Then the induction motors 15, 115, and 215 are started and brought up to normal operational speed, after which, on the take-up reel 102 side, the variable-speed motor 132 is started, and its speed is gradually raised, thereby to raise the tension standard setting voltage $E_{130}$ gradually to the predetermined value and to place the electromagnetic coupling 114 in operation, whereby the required front tension $P_f$ is applied to the strip 60. At the same time, on the side also of the take-off reel 202, the variable-speed motor 232 is operated gradually to raise the tension standard setting voltage $E_{230}$ gradually to the predetermined value and to place the electromagnetic coupling 214 in operation, whereby the required back tension $P_b$ is applied to the strip 60.

Then, with the mill and strip in this state, the rolling speed standard setting voltage of the control circuit 31 for the roll stand section 1 is gradually brought up to the predetermined value by operating the voltage resolator 34 by means of the variable-speed motor 32, whereupon the work rolls 2 and 3 are caused to rotate at the predetermined operational speed. Simultaneously, the voltage $E_{30}$ is applied also to the control circuit 131 for the take-up reel section 101, whereby the rotational speed of the take-up reel 102 is adjusted in accordance with the rolling speed.

If a fluctuation in the front tension $P_f$ on the strip 60 arises, the aforementioned tension adjusting circuit 141 operates, and if the strip 60 slackens or is excessively stretched, the aforementioned abnormal tension correcting circuit 151 operates. Accordingly, the strip 60 is taken up by the take-up reel 102 as the front tension $P_f$ on the strip 60 is constantly maintained at the required value.

On the opposite side, the take-off reel 202 also starts rotating, with slippage, in accordance with the rotation of the work rolls 2 and 3 in the direction opposite to that of the arrow indication in FIG. 1. Although the back tension $P_b$ on the strip 60 increases slightly, and this increase may be corrected by fine adjustment of the tension standard setting voltage $E_{230}$, this increase is corrected, together with fluctuation in tension due to other causes, also by the tension adjusting circuit 241.

Furthermore, fluctuation in the thickness of the strip 60 after its pass through the work rolls 2 and 3, that is, after rolling, is regulated by the thickness regulating circuit 41.

Variations in take-up peripheral speed and torque of the take-up reel 102 due to the increasing diameter of its wound strip during rolling can be preventively corrected by the tension adjusting circuit 141 coupled to the first deflector roll 140 and the abnormal tension correcting circuit 151 coupled to the second deflector roll 150. Variations in the take-off peripheral speed and torque of the take-off reel 202 due to the decreasing diameter of its wound strip can be preventively corrected by the tension adjusting circuit 241 coupled to the second deflector roll 240.

In the case when, oppositely to that described above, the take-up reel section 101 is operated as the take-off side, and the take-off side 201 is used as the take-up side, switches 127 and 155 of the take-up section control circuit 131 and switches 45 and 228 of the take-off section control circuit 231 are opened, and switches 55, 128, and 145 of the take-up section control circuit 131 and switches 227, 245, and 255 of the take-off section control circuit 231 are closed. In addition, by placing the pinion 7 in the reverse position in the roll stand section 1, the work rolls are placed in their states of reverse rotation.

Then, by carrying out the same operation as described hereinabove, the take-up reel section 101 becomes the take-off section, the take-off reel section 201 becomes the take-up section, and the rolling of the strip 60 is carried out in the direction opposite to that described hereinbefore. Thus, by alternately repeating this operation, reversing rolling is possible.

Although the foregoing description has been presented with respect to the case where the invention is applied to a reversible, four-high rolling mill, the invention can be applied with equal facility and effectiveness to other multi-high mills such as those of the six-high, twelve-high, and twenty-high types.

As an example of the wide range of application of the present invention, and in order to indicate still more fully its nature and utility, the following description of a specific embodiment thereof is presented.

In the rolling stand section a twenty-high rolling mill was used with a working roll diameter of 8.31 mm., a barrel length of 140 mm., a first intermediate roll diameter of 17 mm., a second intermediate roll diameter of 35 mm., and a support roll diameter of 58 mm., alloy steel being used for these parts. A 11.0 kw. induction motor was used for driving the rolls, and an induction motor of 0.4 kw. capacity was used for applying pressure to the rolls. Take-off and take-up reels each of 150 mm. diameter was used, and each reel was driven by a 3.7 kw. induction motor. A strain gauge was used for the tension detecting device, a slider type resistor was used for the deflection detecting device, and magnetic amplifiers were used for the electromagnetic couplings and the electromagnetic brakes.

Figure 4:
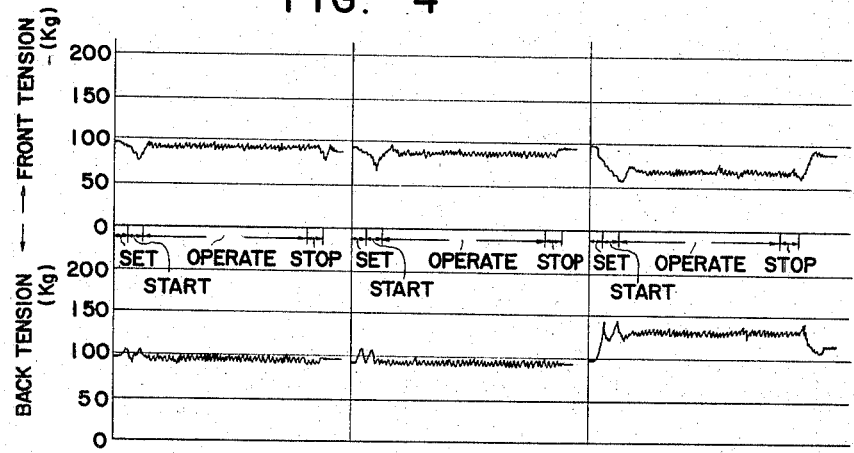
FIG. 4 is a graphical chart indicating an example of actual application of the invention.

The results of rolling low-carbon steel strips of 0.075 mm. thickness through the use of the above described mill are indicated in FIG. 4. As is apparent from these results, by controlling the tensions on the strip according to the present invention, said tensions can be maintained at almost constant values.

It should be understood, furthermore, that in the control systems described above, tension detectors, and thickness gauges other than those described above may be used provided that their outputs can be obtained as electrical outputs. Still furthermore, for the control of the electromagnetic couplings and electromagnetic brakes, not only magnetic amplifiers but other devices such as those depending on hot-cathode, grid-controlled discharge tubes can be used.

Moreover, it will be apparent that the present invention is applicable to a wide range of processes, other than the rolling of metal materials, such as wire drawing and paper-making processes.

As described above, the present invention affords easy and stepless adjustment and control of rolling speed, front tension, and back tension over substantially wide ranges of values. By the practice of this invention, the above described adjustment and control procedures can be readily carried out even during operation of the apparatus. Moreover, the invention provides an apparatus requiring lower equipment cost than conventional apparatuses of equivalent performance.

It should be understood, of course that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. In the adjustment and control of the take-up and take-off devices including take-up and take-off reels used in a reversible apparatus for reducing work material dimensions, a system which comprises an electromagnetic coupling and an electromagnetic brake provided between said reels and a respective alternating-current motor, and an apparatus adapted to adjust and control the take-up and take-off tensions on and speeds of said work material by controlling the exciting currents supplied to said couplings and said brakes.

2. In a reversible apparatus for reducing work material dimensions, a combination of a material take-up device disposed on one side of the material working section and a material take-off device disposed on the other side of said section, said combination comprising: (1) a material take-up reel and a material take-off reel each provided with a respective alternating-current motor for driving said reel and a respective combination consisting of an electromagnetic coupling and an electromagnetic brake provided between said reel and its respective said motor to control the transmission of mechanical power therebetween; (2) a generator for detection of the rotational speed of each of said reels; (3) a tension detecting device for detecting the tension applied to said work material on each of the take-up and take-off sides; (4) circuits to maintain the speeds and torques of said reels at their respective predetermined values by controlling the exciting currents to said electromagnetic couplings or electromagnetic brakes of said reels depending on the positive or negative signs of the difference voltages between the sums resulting from the addition of the output voltage of a standard setting circuit for the material working speed to the output voltages of standard setting circuits for tension provided on the take-up and take-off sides of the work material and the output voltages of said speed detecting generators of said reels; and (5) circuits to regulate correctively fluctuations from set standard values of the tensions applied to the work material by controlling the exciting currents of the electromagnetic couplings and electromagnetic brakes of said reels in accordance with the differences between the output voltages of said tension detecting devices and the output voltages of corresponding tension standard setting devices.

3. The combination of a material take-up device and a material take-off device according to claim 2, wherein there is further provided: (6) circuits to adjust correctively slack and excessive tension in the work material by adjusting the exciting currents of electromagnetic couplings and electromagnetic brakes for said reels in accordance with the output voltages of abnormal tension detection devices generating voltages proportional to slack and excessive tension in the work material.

4. The combination of a material take-up device and a material take-off device according to claim 2, wherein there is further provided: (7) circuits to regulate correctively fluctuations in at least one dimension of the work material by controlling the exciting current of the electromagnetic coupling of either the take-off reel side or the take-up reel side depending on and in accordance with the difference voltage between the output voltage of one of two-material dimension detecting devices provided respectively on the take-up reel side and the take-off side of and in the vicinity of the entrance-exit part of the material working section and the output voltage of a corresponding standard setting device for the work material dimension.

5. The combination of a materal take-up device and a material take-off device according to claim 3, wherein there are further provided: (7) circuits to regulate correctively fluctuations in at least one dimension of the work material by controlling the exciting current of the electromagnetic coupling of either the take-off reel side or the take-up reel side depending on and in accordance with the difference voltage between the output voltage of one of two material dimension detecting devices provided respectively on the take-up reel side and the take-off reel side of and in the vicinity of the entrance-exit part of the material working section and the output voltage of a corresponding standard setting device for the work material dimension.

6. In the working of a material in a reversible apparatus for reducing work material dimensions of the type having material working rolls and material take-up and take-off devices including respective reels, a system which comprises an electromagnetic coupling in the mechanical power transmission mechanism between said material working rolls and an alternating-current motor, an electromagnetic coupling and an electromagnetc brake provided between said reels and a respective alternating-current motor, and an apparatus adapted to adjust and control the working speed of said material working rolls and the take-up and take-off tensions and speeds of said take-up and take-off reels by controlling the exciting currents of all said electromagnetic couplings and electromagnetic brakes.

7. The art according to claim 6, wherein an electromagnetic brake is additionally inserted between said working rolls and their motor, and the exciting current of said electromagnetic brake is also controlled in controlling the working speed of said material working rolls.

8. A reversible apparatus for reducing work material dimensions comprising: (1) Work rolls for working materials, said rolls being driven by an alternating-current motor through an electromagnetic coupling provided therebetween for the purpose of controlling the transmission of mechanical power of said motor to said rolls; (2) a work material take-up reel and a work material take-off reel each driven by an alternating-current motor through an electromagnetic coupling and an electromagnetic brake provided therebetween for the purpose of controlling the transmission of mechanical power to said motor to said reel; (3) speed detection generators to detect, respectively, the speeds of said work rolls, said take-up reel, and said take-off reel; (4) tension detection devices to detect, respectively, the tensions applied to the work material on the take-up reel side and on the take-off reel side; (5) a circuit to maintain the rotational speed and torque of said work rolls at nearly constant values by controlling the exciting current of said electromagnetic coupling for the work rolls in accordance with the difference voltage between the output voltage of a standard setting circuit for speed of working the material and the output voltage of said speed detection generator for the work rolls; (6) circuits to maintain the rotational speeds and torques of said reels at respective, nearly constant values in correspondence with the rotational speed of the work rolls by controlling, in the case of each of said reels, the exciting current of either he electromagnetic coupling or the electromagnetic brake for said reel depending on the positive or negative sign of the difference voltage between the sum resulting the addition of a standard voltage for the speed of working said material to the output voltage of the tension standard setting circuit for said reel and the output voltage of the speed detection generator for said reel; and (7) circuits to regulate correctively fluctuations from set standard values of the tensions applied to the material by controlling, in the case of each of the said reels, the exciting currents of the electromagnetic coupling and the electromagnetic brake for said reel in accordance with the difference voltage between the output voltage of said tension detecting device for said reel and the output voltage of a tension standard setting device for said reel.

9. The reversible apparatus for reducing work material dimensions according to claim 8, wherein there is further provided: (8) circuits to adjust correctively slack and excessive tension in the work material by controlling the exciting currents of the electromagnetic couplings and electromagnetic brakes of said reels in accordance with the output voltages of abnormal tension detection devices generating voltages proportional to slack and excessive tension in the work material.

10. The reversible apparatus for reducing work material dimensions according to claim 8, wherein there is further provided: (9) circuits to regulate correctively fluctuations in at least one dimension of the work material by controlling the exciting current of the electromagnetic coupling of either the take-off reel side or the take-up reel side depending on and in accordance with the difference voltage between the output voltage of one of two material dimension detecting devices provided respectively on the take-up reel side and the take-off reel side of and in the vicinity of the material entrance-exit part of the work rolls and the output voltage of a corresponding standard setting device for the work material dimension.

11. The reversible apparatus for reducing work material dimensions according to claim 9, wherein there is further provided: (9) circuits to regulate correctively fluctuations in at least one dimension of the work material by controlling the exciting current of the electromagnetic coupling of either the take-off reel side or the take-up reel side depending on and in accordance with the difference voltage between the output voltage of one of two material dimension detecting devices provided respectively on the take-up reel side and the take-off reel side of and in the vicinity of the material entrance-exit part of the work rolls and the output voltage of a corresponding standard setting device for the work material dimension.

12. The reversible apparatus for reducing work material dimensions according to claim 8, wherein there is further provided an electromagnetic brake in combination with said electromagnetic coupling for the purpose of controlling the transmission of mechanical power of said motor to said rolls, and said circuit to maintain the rotational speed and torque of said work rolls at nearly constant values accomplishes its function by controlling the exciting current to either said electromagnetic coupling or said electromagnetic brake for said work rolls depending on the positive or negative sign of said difference voltage.

13. The reversible apparatus for reducing work material dimensions according to claim 9, wherein there is further provided an electromagnetic brake in combination with said electromagnetic coupling for the purpose of controlling the transmission of mechanical power of said motor to said rolls, and said circuit to maintain the rotational speed and torque of said work rolls at nearly constant values accomplishes its function by controlling the exciting current to either said electromagnetic coupling or said electromagnetic brake for said work rolls depending on the positive or negative sign of said difference voltage.

14. The reversible apparatus for reducing work material dimensions according to claim 10, wherein there is further provided an electromagnetic brake in combination with said electromagnetic coupling for the purpose of controlling the transmission of mechanical power of said motor to said rolls, and said circuit to maintain the rotational speed and torque of said work rolls at nearly constant values accomplishes its function by controlling the exciting current to either said electromagnetic coupling or said electromagnetic brake for said work rolls depending on the positive or negative sign of said difference voltage.

15. The reversible apparatus for reducing work material dimensions according to claim 11, wherein there is further provided an electromagnetic brake in combination with said electromagnetic coupling for the purpose of controlling the transmission of mechanical power of said motor to said rolls, and said circuit to maintain the rotational speed and torque of said work rolls at nearly constant values accomplishes its function by controlling the exciting current to either said electromagnetic coupling or said electromagnetic brake for said work rolls depending on the positive or negative sign of said difference voltage.

References Cited by the Examiner

UNITED STATES PATENTS

| | | | |
|---|---|---|---|
| 1,667,678 | 4/1928 | Riecke | 72—29 |
| 1,716,039 | 6/1929 | Fries | 72—29 |
| 1,792,458 | 2/1931 | Barten | 72—29 |
| 1,851,760 | 3/1932 | Ellis | 72—29 |
| 2,043,208 | 6/1936 | Bohn | 72—29 |
| 2,143,357 | 1/1939 | Montgomery | 72—29 |
| 2,157,739 | 5/1939 | McBain | 72—11 |
| 2,162,527 | 6/1939 | Cook | 72—19 |
| 2,594,035 | 4/1952 | King | 72—205 |
| 2,601,527 | 6/1952 | Hunt | 72—10 |
| 2,684,458 | 7/1954 | Winchester | 72—29 |
| 3,089,365 | 5/1963 | Wallace | 72—16 |

CHARLES W. LANHAM, *Primary Examiner.*

A. RUDERMAN, *Assistant Examiner.*